(12) United States Patent
Lee et al.

(10) Patent No.: US 10,669,366 B2
(45) Date of Patent: Jun. 2, 2020

(54) PHOTO-CURABLE RESIN COMPOSITION AND USE OF THE SAME

(71) Applicant: LG Chem, Ltd., Seoul (KR)

(72) Inventors: Seung Min Lee, Daejeon (KR); Si Yeon Baek, Daejeon (KR); So Young Kim, Daejeon (KR); Se Woo Yang, Daejeon (KR)

(73) Assignee: LG Chem, Ltd. (KR)

( * ) Notice: Subject to any disclaimer, the term of this patent is extended or adjusted under 35 U.S.C. 154(b) by 158 days.

(21) Appl. No.: 15/759,385

(22) PCT Filed: May 30, 2017

(86) PCT No.: PCT/KR2017/005618
§ 371 (c)(1),
(2) Date: Mar. 12, 2018

(87) PCT Pub. No.: WO2018/021674
PCT Pub. Date: Feb. 1, 2018

(65) Prior Publication Data
US 2018/0251587 A1    Sep. 6, 2018

(30) Foreign Application Priority Data
Jul. 27, 2016 (KR) .................... 10-2016-0095157

(51) Int. Cl.
*C08F 290/06* (2006.01)
*C09J 4/00* (2006.01)
(Continued)

(52) U.S. Cl.
CPC ............ *C08F 290/068* (2013.01); *B32B 7/12* (2013.01); *B32B 17/06* (2013.01); *C08F 2/48* (2013.01);
(Continued)

(58) Field of Classification Search
CPC .............. C08F 290/068; C08F 220/20; C08F 2220/1875; C08F 2220/1883;
(Continued)

(56) References Cited

U.S. PATENT DOCUMENTS 5,147,957 A * 9/1992 Kumar .................. C07F 7/0812
528/15
5,264,278 A * 11/1993 Mazurek .................. C09J 4/06
428/317.3
(Continued)

FOREIGN PATENT DOCUMENTS

EP          1674505 A1    6/2006
JP       2014001341 A    1/2014
(Continued)

OTHER PUBLICATIONS

Search report from International Application No. PCT/KR2017/005618, dated Sep. 7, 2017.

*Primary Examiner* — Michael B Nelson
(74) *Attorney, Agent, or Firm* — Lerner, David, Littenberg, Krumholz & Mentlik, LLP (57) ABSTRACT

The present application relates to a photo-curable resin composition and a use of the same. The present application can provide a photo-curable resin composition having not only excellent various physical properties such as heat resistance, adhesive force and cohesive force but also an elastic modulus after pre-curing which is suitable for a Dam & Fill process. The photo-curable resin composition may be useful for direct bonding between optical members or as a filling agent of an air gap.

11 Claims, 2 Drawing Sheets

(51) Int. Cl.
*C08G 77/388* (2006.01)
*C08G 77/20* (2006.01)
*C08F 2/48* (2006.01)
*C08F 20/28* (2006.01)
*B32B 7/12* (2006.01)
*B32B 17/06* (2006.01)
*C09J 4/06* (2006.01)
*C09J 11/04* (2006.01)
*C09J 11/06* (2006.01)
C08F 230/08 (2006.01)
C08K 3/36 (2006.01)
C08K 5/134 (2006.01)
C08K 5/5435 (2006.01)

(52) U.S. Cl.
CPC ............. *C08F 20/28* (2013.01); *C08G 77/20* (2013.01); *C08G 77/388* (2013.01); *C09J 4/00* (2013.01); *C09J 4/06* (2013.01); *C09J 11/04* (2013.01); *C09J 11/06* (2013.01); *B32B 2457/20* (2013.01); *C08F 2230/085* (2013.01); *C08K 3/36* (2013.01); *C08K 5/1345* (2013.01); *C08K 5/5435* (2013.01); *C08K 2201/005* (2013.01); *C08K 2201/011* (2013.01)

(58) Field of Classification Search
CPC ............. C08F 2222/1013; C08F 20/28; C08F 2230/085; C08F 2/48; B32B 17/06; B32B 2457/20; B32B 7/12; C08G 77/20; C08G 77/388; C08K 2201/005; C08K 2201/011; C08K 3/36; C08K 5/1345; C08K 5/5435; C09J 11/04; C09J 11/06; C09J 4/00; C09J 4/06
See application file for complete search history.

(56) References Cited

U.S. PATENT DOCUMENTS

2013/0310464 A1* 11/2013 Jaunky ................ C08G 18/289
514/772.1
2015/0299523 A1   10/2015 Park et al.
2015/0373838 A1   12/2015 Sawada et al.

FOREIGN PATENT DOCUMENTS

| JP | 5940456 B2 | 6/2016 |
| KR | 20150016917 A | 2/2015 |
| WO | 9610608 A1 | 4/1996 |

* cited by examiner

[Figure 1]

| 10 |
|---|
| 30 |
| 20 |

[Figure 2]

| | 10 | |
|---|---|---|
| 40 | 30 | 40 |
| | 20 | |

PHOTO-CURABLE RESIN COMPOSITION AND USE OF THE SAME

CROSS-REFERENCE TO RELATED APPLICATIONS

The present application is a national phase entry under 35 U.S.C. § 371 of International Application No. PCT/KR2017/005618 filed May 30, 2017, which claims priority from Korean Patent Application No. 10-2016-0095157 filed on Jul. 27, 2016, the disclosures of which are hereby incorporated herein by reference.

TECHNICAL FIELD

The present application relates to a photo-curable resin composition and a use of the same.

BACKGROUND ART

Direct bonding means a bonding technique for manufacturing a display device in which a plurality of optical members, for example, a touch panel and a display panel, and the like are combined into one. The direct bonding can be referred to as a term such as optical bonding, full lamination or screen fit.

The properties required for bonding agents used in direct bonding include heat resistance, cohesive force, adhesive force, transparency and the like, and recently, in particular, the demand for high heat resistance performance is increasing.

It is necessary to develop a bonding agent having high heat resistance performance and adhesive force simultaneously, where a bonding agent having excellent performance can be prepared by using advantages of acrylics having low cost and excellent adhesive force and silicone materials having excellent heat resistance. Patent Document 1 (JP Laid-open Patent Publication No. 2014-001341) discloses a curable resin composition using the silicone and the acrylic.

However, the preceding document lacks mention of physical properties related to the direct bonding process. A typical process of the direct bonding is Dam & Fill process. The Dam & Fill process is a laminating process by pre-curing a dam using a photo-curable resin composition, and then coating an active region with the photo-curable resin composition to completely cure it.

However, the Dam & Fill process has a problem that a lot of defects are generated in the laminating process. For example, if the elastic modulus upon pre-curing is too high, it is difficult to maintain a gap due to restoring force after lamination, so that air bubbles may occur between the dam and the fill. On the other hand, if the elastic modulus is too low, there is a risk that the photo-curable composition of the fill region bursts out upon laminating.

DISCLOSURE

Technical Problem

The present application provides a photo-curable resin composition having excellent various physical properties such as heat resistance, adhesive force and cohesive force, as well as being suitable for the Dam & Fill process, and a use of the same.

Technical Solution

The present application relates to a photo-curable resin composition. The photo-curable resin composition satisfies the following Equation 1.

$$40\% \leq S_{60}/S_0 < 80\% \quad \text{[Equation 1]}$$

In Equation 1 above, $S_0$ is an initial stress when a shear strain of 5% has been applied to the photo-curable resin composition after curing it by irradiating it with light having a wavelength of 395 nm at an intensity of 100 mW/cm² and a light quantity of 200 mJ/cm², and $S_{60}$ is a stress after 60 seconds.

In Equation 1, the initial stress ($S_0$) means a stress measured immediately after applying a shear strain of 5% thereto. In Equation 1 above, the stress ($S_{60}$) after 60 seconds means a stress measured 60 seconds after applying a shear strain of 5% thereto. In this specification, when the time is described in seconds, it may comprise an error within about ±1 second.

The photo-curable resin composition satisfying Equation 1 above may have not only excellent various physical properties such as heat resistance, adhesive force and cohesive force, but also physical properties suitable for the Dam & Fill process, for example, an elastic modulus in an appropriate range after pre-curing, so that the lamination performance is excellent.

The initial stress ($S_0$) and the stress ($S_{60}$) after 60 seconds can be adjusted to satisfy Equation 1 above in view of the object of the present application. The initial stress ($S_0$) may be, for example, 300 Pa to 1000 Pa. The stress ($S_{60}$) after 60 seconds may be 120 Pa to 800 Pa.

The components and ratios contained in the photo-curable resin composition can be adjusted to satisfy Equation 1 above.

For example, the photo-curable resin composition may comprise a reactive silicone oligomer. The reactive silicone oligomer may be a compound having at least one reactive functional group through a urethane bond at the terminal of polysiloxane main chain. In this specification, a silicone oligomer having n reactive functional groups at the terminal may be referred to as an n-functional silicone oligomer.

The reactive functional group may mean a polymerizable group or a crosslinkable group, and may be exemplified by, for example, a (meth)acryl group. Hereinafter, the compound having at least one (meth)acryl group at the terminal of the polysiloxane main chain through a urethane bond is referred to as polysiloxane-modified urethane (meth)acrylate.

The polysiloxane may be exemplified by polyorganosiloxane, and according to one embodiment of the present application, polydimethylsiloxane may be used.

The polysiloxane-modified urethane (meth)acrylate may be a urethane reaction product of a polysiloxane containing hydroxyl group, a polyfunctional isocyanate and a (meth)acrylate containing hydroxyl group. In this specification, the compound containing hydroxyl group may mean a compound having a hydroxyl group (—OH) at the terminal.

The polysiloxane containing hydroxyl group may be a compound represented by Formula 1 below.

[Formula 1]

In Formula 1 above, $R_1$ and $R_2$ are each independently a single bond, a hydrocarbon group or an organic group containing heteroatom or ether group, $R_3$ to $R_8$ are each independently an alkyl group, a cycloalkyl group or a phenyl group, a is an integer of 10 or more, and b and c are each independently an integer of 0 to 3, provided that the sum of b and c is 1 or more.

The hydrocarbon group may be, for example, a hydrocarbon group having 1 to 100 carbon atoms, specifically 1 to 25 carbon atoms, more specifically 1 to 5 carbon atoms, and may be a divalent or trivalent hydrocarbon group. As the divalent hydrocarbon group, for example, an alkylene group can be exemplified. The number of carbon atoms in the alkylene group is preferably from 1 to 10, and particularly preferably from 1 to 4, and for example, an ethylene group, a propylene group or a tetramethylene group, and the like can be exemplified.

As the organic group containing heteroatom, an oxyalkylene group, a polyoxyalkylene group, a polycaprolactone group or an amino group, and the like can be exemplified.

As the organic group containing ether group, an ethyl ether group and the like can be exemplified.

In Formula 1 above, each $R_2$ may be independently an alkyl group, a cycloalkyl group or a phenyl group. The alkyl group may be an alkyl group having, for example, 1 to 15 carbon atoms, specifically 1 to 10 carbon atoms, more specifically 1 to 4 carbon atoms, and for example, preferably, it is a methyl group, an ethyl group, a propyl group or a butyl group, and the like, and particularly preferably, it is a methyl group.

The cycloalkyl group may be a cycloalkyl group having, for example, 3 to 10 carbon atoms, specifically 5 to 8 carbon atoms, and for example, a cyclopentyl group, a cyclohexyl group or a norbornyl group, and the like can be exemplified.

The alkyl group, cycloalkyl group and phenyl group may also have a substituent. As the substituent, a halogen atom, a hydroxyl group, an alkoxy group, an amino group, a mercapto group, a sulfanyl group, a vinyl group, an acryloxy group, a methacryloxy group, an aryl group or a heteroaryl group, and the like can be exemplified.

In Formula 1 above, a may be an integer of 10 or more, specifically 30 to 200, more specifically 40 to 120. b and c may be each independently an integer of 0 to 3, provided that the sum of b and c may be 1 or more, and for example, each of b and c may be 1.

The polysiloxane containing hydroxyl group is, specifically, a compound having a hydroxyl group at the terminal of polysiloxane such as polydimethylsiloxane, polydiethylsiloxane and polymethylphenylsiloxane, and for example, polymethylsiloxane having a hydroxyl group at the terminal thereof can be used. As the polydimethylsiloxane having a hydroxyl group at the terminal thereof, for example, polydimethylsiloxane monool having one hydroxyl group at one terminal thereof, polydimethylsiloxane diol having two hydroxyl groups at one terminal thereof or polydimethylsiloxane diol having each one hydroxyl group at both terminals thereof can be exemplified.

As the polydimethylsiloxane monool having one hydroxyl group at one terminal thereof, X-22-4015 (manufactured by Shin-Etsu Chemical Co., Ltd.), and Silaplane FM-0411, FM-0421 and FM-0425 (manufactured by Chisso Corporation) can be exemplified; as the polydimethylsiloxane diol having two hydroxyl groups at one terminal thereof, Silaplane FM-DA11, FM-DA21 and FM-DA26 (manufactured by Chisso Corporation) can be exemplified; and as the polydimethylsiloxane diol having each one hydroxyl group at both terminals thereof, X-22-160 AS, KF-6001, KF-6002 and KF-6003 (manufactured by Shin-Etsu Chemical Co., Ltd.), Silaplane FM-4411, FM-4421 and FM-4425 (manufactured by Chisso Corporation), macromonomer-HK-20 (manufactured by Donga Synthesis Co., Ltd.), and the like can be exemplified.

As the polyfunctional isocyanate, a compound having at least two isocyanate groups may be used. Specifically, as the polyfunctional isocyanate, diisocyanate such as hexamethylene diisocyanate (HDI), isophorone diisocyante (IPDI), methylene bis(4-cyclohexyl isocyanate) (H12MDI), trimethylhexamethylene diisocyanate (TMHMDI), tolylene diisocyanate (TDI), 4,4-diphenylmethane diisocyanate (MDI) and xylene diisocyanate (XDI), and the like can be exemplified. Furthermore, an adduct in which diisocyanate is modified with trimethylolpropane, a trimer (isocyanurate) of diisocyanate or a burette by reacting diisocyanate with water, and the like can be used alone or in combination of two or more of the foregoing.

As the (meth)acrylate containing hydroxyl group, hydroxyalkyl (meth)acrylate can be used. As the (meth)acrylate containing hydroxyl group, for example, hydroxyalkyl (meth)acrylate such as 2-hydroxyethyl (meth)acrylate, 2-hydroxypropyl (meth)acrylate, 2-hydroxybutyl (meth)acrylate, 4-hydroxybutyl (meth)acrylate and 6-hydroxyhexyl (meth)acrylate; 2-hydroxyethyl acryloylphosphate, 2-(meth)acryloyloxyethyl-2-hydroxypropyl phthalate, caprolactone modified 2-hydroxyethyl (meth)acrylate, dipropylene glycol (meth)acrylate, fatty acid modified glycidyl (meth)acrylate, polyethylene glycol mono(meth)acrylate, polypropylene glycol mono(meth)acrylate, 2-hydroxy-3-(meth)acryloyloxypropyl (meth)acrylate, glycerin di(meth)acrylate, pentaerythritol tri(meth)acrylate, caprolactone modified pentaerythritol tri(meth)acrylate, ethylene oxide modified pentaerythritol tri(meth)acrylate, dipentaerythritol penta(meth)acrylate, caprolactone modified dipentaerythritol penta(meth)acrylate or ethylene oxide modified dipentaerythritol penta(meth)acrylate, and the like can be exemplified, and these can be used alone or in combination of two or more.

The photo-curable resin composition may comprise the reactive silicone oligomer in a ratio of 20 to 70 parts by weight. If the content of the reactive silicone oligomer is less than the above range, the heat resistance may be insufficient due to a decrease in the degree of crosslinking, whereas if it is more than the above range, there may be a problem that the elastic modulus increases excessively.

As the reactive silicone oligomer, for example, a monofunctional silicone oligomer, a difunctional silicone oligomer, or a trifunctional or higher silicone oligomer may be used. The photo-curable resin composition may also comprise one of the reactive oligomers or may also comprise a mixture of two or more reactive silicone oligomers.

In one example, the photo-curable resin composition may comprise a difunctional silicone oligomer. When the photo-curable resin composition comprises a difunctional silicone oligomer, it may be advantageous to exhibit a high heat resistance performance since the crosslinking structure can be achieved over a certain level.

The photo-curable resin composition may further comprise a monofunctional silicone oligomer or a trifunctional or higher silicone oligomer. When the photo-curable resin composition comprises a monofunctional silicone oligomer and a difunctional silicone oligomer, the monofunctional silicone oligomer may be contained in the photo-curable resin composition in a ratio of 20 to 500 parts by weight relative to 100 parts by weight of the difunctional silicone oligomer. When the photo-curable composition comprises a trifunctional or higher silicone oligomer and a difunctional silicone oligomer, the trifunctional silicone oligomer may be contained in the photo-curable resin composition in a ratio of 2 to 50 parts by weight relative to 100 parts by weight of the difunctional silicone oligomer.

The reactive silicone oligomer may have a weight average molecular weight of 10,000 to 100,000, more specifically 30,000 to 80,000. When the weight average molecular weight of the reactive silicone oligomer satisfies the above range, it is possible to provide a photo-curable resin composition which has excellent various physical properties such as heat resistance, adhesive force and cohesive force, as well as exhibits an elastic modulus after pre-curing, which is suitable for the Dam & Fill process. In this specification, the weight average molecular weight may mean a converted value in terms of standard polystyrene measured by a gel permeation chromatography (GPC) method.

The photo-curable resin composition may further comprise a non-reactive silicone oligomer. When the photo-curable resin composition further comprises the non-reactive silicone oligomer, various physical properties such as adhesive force, cohesive force and heat resistance can be further improved.

The non-reactive silicone oligomer may be a compound having no reactive functional group at the terminal of the polysiloxane main chain. In one example, the non-reactive silicone oligomer may be a compound having a non-reactive substituent connected to the terminal silicon (Si) of the polysiloxane main chain. As the non-reactive substituent, hydrogen, a hydrocarbon group or an organic group containing heteroatom or ether group can be exemplified, and more specifically, hydrogen, an alkyl group or an alkoxy group can be exemplified. Such a non-reactive silicone oligomer may be, for example, a compound represented by Formula 2 below.

[Formula 2]

In Formula 2 above, $R_1$ and $R_2$ are each independently hydrogen, a hydrocarbon group or an organic group containing heteroatom or ether group, $R_3$ to $R_8$ are each independently an alkyl group, a cycloalkyl group or a phenyl group, and a is an integer of 10 or more.

As the non-reactive silicone oligomer, for example, silicone oil or silicone fluid products, such as FM-0411, FM-0421, FM-0425, FMDA11, FM-DA21, FM-DA26, FM-4411, FM-4421 and FM-4425 (Chisso Corporation), DMS-T00, DMS-T01, DMS-T02, DMS-T03, DMS-T05, DMS-T07, DMS-T11, DMS-T12, DMS-T15, DMS-T21, DMS-T22, 23, DMS-T25, DMS-T31, DMS-T35, DMS-T41, DMS-T43, DMS-T46, DMS-T51, DMS-T53, DMS-T56, PDM-0421, PDM-0821, PDM-1922, PMM-1015, PMM-1025, PMM-1043, PMM-5021, PMM-0011, PMM-0021 and PMM-0025 (Gelest Corporation), and X-22-4039, X-22-4015, KF-99, KF-9901, KF-6000, KF-6001, KF-6002. KF-6003, KF-6004, X-22-4952, X-22-4272, KF-6123, X-21-5841, KF-9701, X-22-170BX, X-22-170DX, X-22-176DX, X-22-176F, X-22-176GX-A, KF-6011, KF-6012, KF-6015, KF-6017 (Shinetsu Co., Ltd.), can be used.

In another example, the non-reactive silicone oligomer may be a compound having a non-reactive substituent through a urethane bond at the terminal of the polysiloxane main chain. As the non-reactive substituent, hydrogen, a hydrocarbon group or an organic group containing heteroatom or ether group can be exemplified, and more specifically, hydrogen, an alkyl group or an alkoxy group can be exemplified. Hereinafter, such a non-reactive silicone oligomer is referred to as polysiloxane-modified urethane oligomer.

The polysiloxane, may be exemplified by polyorganosiloxane, and according to one embodiment of the present application, polydimethylsiloxane may be used.

The polysiloxane-modified urethane oligomer may be a urethane reaction product of a polysiloxane containing hydroxyl group, a polyfunctional isocyanate and a non-reactive monomer containing hydroxyl group. For the polysiloxane containing hydroxyl group and the polyfunctional isocyanate, the contents described in the item of the reactive silicone oligomer can be applied equally. As the non-reactive monomer containing hydroxyl, a monomer having a hydroxyl group and the non-reactive substituent at the terminal thereof may be used. As the specific example of the non-reactive substituent, a methyl group, an ethyl group, a propyl group, a butyl group, a methoxy group or an ethoxy group, and the like can be exemplified.

The non-reactive silicone oligomer may have a weight average molecular weight (Mw) of 10,000 to 50,000. If the weight average molecular weight of the non-reactive oligomer satisfies the above range, it is possible to provide a photo-curable resin composition which has excellent various physical properties such as heat resistance, adhesive force and cohesive force, as well as exhibits an elastic modulus suitable for the Dam & Fill process.

In addition to the oligomer, the photo-curable resin composition may comprise monomers for the purpose of adjusting the modulus upon pre-curing, adjusting the curing rate, adjusting the reactivity or diluting the viscosity, and the like.

The monomer may comprise an ethyl ether-based acrylate as a first monomer. The ethyl ether-based acrylate may have 1 to 2 acryl groups. When the photo-curable resin composition comprises the ethyl ether-based acrylate, it is advantageous in adjusting the modulus upon pre-curing and the curing rate.

The ethyl ether-based acrylate may be a compound represented by Formula 3 or 4 below.

[Formula 3]

[Formula 4]

In Formulas 3 and 4 above, n is an integer of 1 to 6, $R_1$ is hydrogen, a hydrocarbon group or an organic group containing heteroatom or ether group, and $R_2$ to $R_4$ are each independently hydrogen or an alkyl group having 1 to 4 carbon atoms.

In Formulas 3 and 4 above, n may be 2 or 3. In Formulas 3 and 4 above, $R_2$ and $R_4$ may be each independently hydrogen or a methyl group. As the specific example of the compound represented by Formula 4 above, diethylene glycol diacrylate or triethylene glycol diacrylate, and the like can be exemplified.

The photo-curable resin composition may comprise the ethyl ether-based acrylate in a ratio of 0.5 to 5 parts by weight. When the content of the ethyl ether-based acrylate is less than the above range, there may be a problem that the modulus becomes too high upon pre-curing and thus bubbles occur upon laminating, whereas if it is more than the above range, there may be a problem that the curing rate is slowed and thus the dam becomes soft.

The monomer may further comprise acrylate containing no ethyl ether group as a second monomer. As the second monomer, monofunctional (meth)acrylate, or polyfunctional, such as difunctional, trifunctional, tetrafunctional, pentafunctional and hexafunctional, (meth)acrylate can be exemplified. As the second monomer, for example, monofunctional (meth)acrylate or difunctional (meth)acrylate may be selected and used.

As the second monomer, alkyl (meth)acrylate may be used. As the alkyl group of the (meth)acrylate, a linear, branched or cyclic alkyl group having 1 to 20 carbon atoms, 1 to 16 carbon atoms, 1 to 12 carbon atoms or 1 to 10 carbon atoms may be exemplified. As the second monomer, methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isobornyl (meth)acrylate, isooctyl (meth)acrylate, isononyl (meth)acrylate and lauryl (meth)acrylate, and the like can be exemplified.

As the second monomer, alkyl acrylate further comprising a functional group such as a hydroxyl group, a carboxyl group, an isocyanate group or a glycidyl group can be used. As the specific example of the second monomer, hydroxyalkyl acrylate can be exemplified. As the second monomer, hydroxyalkyl (meth)acrylate such as 2-hydroxyethyl (meth)acrylate, 2-hydroxypropyl (meth)acrylate, 4-hydroxybutyl (meth)acrylate, 6-hydroxyhexyl (meth)acrylate and 8-hydroxyoctyl (meth)acrylate, or hydroxyalkylene glycol (meth)acrylate such as 2-hydroxyethylene glycol (meth)acrylate and 2-hydroxypropylene glycol (meth)acrylate, and the like can be exemplified.

When the photo-curable resin composition further comprises the second monomer in addition to the first monomer, the total ratio of the first monomer and the second monomer may be 3 to 30 parts by weight relative to 100 parts by weight of the photo-curable resin composition. When the content of the monomers is in the above range, it is suitable for diluting the viscosity of the photo-curable resin composition and adjusting the reactivity.

The photo-curable resin composition may comprise a trifunctional or higher meth(acrylate) containing an alkoxy (i.e., alkylene oxide) repeating unit (hereinafter, referred to as a third monomer). The alkoxy (i.e., alkylene oxide) repeating unit typically has a formula —[O-L]-, wherein L is a linear or branched alkylene. The alkylene may be a linear or branched alkylene having 2 to 6 carbon atoms. The third monomer may be a compound represented by Formula 5 below.

[Formula 5]

In Formula 5 above, $R_1$ may be a trivalent or higher organic residue, $R_2$ may be hydrogen or a methyl group, and for each m, L may be independently a linear or branched alkylene group having 2 to 6 carbon atoms, and for each p, m may be independently an integer of 1 to 30, and more specifically, m may be an integer of 1 to 20, 1 to 15, or 1 to 10.

In one example, the third monomer may comprise a linear alkoxy repeating unit, such as an ethylene oxide repeating unit. Such a monomer can be represented by the following formula:

$$R((OC_nH_{2n})_mOC(O)C(R_6)\!=\!CH_2)_p$$

In the above formula, R is an organic residue having a valence of p, n is the number of carbon atoms of the alkoxy repeating unit, m is the number of alkoxy repeating units, $R_6$ is hydrogen or methyl, and p is an integer of 3 or more. For each m, n may be independently an integer from 1 to 4. In one example, the number of alkoxy repeating units, m, may be an integer of more than 6 and less than 20. In one example, p may be at least 4, 5 or 6. In one example, R is a hydrocarbon residue optionally further comprising one or more oxygen, sulfur or nitrogen atoms. In one example, R may comprise from 3 to 12 carbon atoms.

In another example, the third monomer may comprise branched alkoxy repeating units, such as isopropylene oxide and/or isobutylene oxide repeating units. Such a monomer can be represented by the following formula:

$$R((OC_n(CH_3)_qH_{2n-q})_mOC(O)\!-\!C(R_6)\!=\!CH_2)_p$$

In the above formula, R and p are as previously described. In the case of a branched isopropylene oxide repeating unit, n is 2 and q is 1. In the case of a branched isobutylene oxide repeating unit, n is 2 and q is 2.

The third monomer may comprise any combination of linear and/or branched alkoxy repeating units having 2 to 4 carbon atoms. Accordingly, the third monomer may comprise only ethylene oxide repeating units, may comprise only propylene oxide repeating units, may comprise only butylene oxide repeating units, as well as may comprise a combination thereof. In one example, the third monomer may comprise a combination of both ethylene oxide and propylene oxide repeating units.

The solid content concentration of the total amount of the third monomer in the cured photo-curable resin composition may be 5 wt % or more, 10 wt % to 40 wt %, and 35 wt % or less, 30 wt % or less, or 25 wt % or less.

The photo-curable resin composition may comprise a trifunctional or higher (meth)acrylate containing no alkoxy repeating unit (hereinafter, referred to as crosslinking monomer). The crosslinking monomer may have 3, 4, 5 or 6 or more (meth)acryl groups.

As the commercially available crosslinking monomer, for example, trimethylolpropane triacrylate (available under the brand name "SR351" from Sartomer Company (Exton, Pa., USA)), ethoxylated trimethylolpropane triacrylate (available under the brand name "SR454" from Sartomer Company (Exton, Pa., USA)), pentaerythritol tetraacrylate, pentaerythritol triacrylate (available under the brand name "SR444" from Sartomer Company), dipentaerythritol pentaacrylate (available under the brand name "SR399" from Sartomer Company), ethoxylated pentaerythritol tetraacrylate, ethoxylated pentaerythritol triacrylate (available under the brand name "SR494" from Sartomer Company), dipentaerythritol hexaacrylate, and tri(2-hydroxyethyl)isocyanurate triacrylate (available under the brand name "SR368" from Sartomer Company and the like can be exemplified.

The solid content concentration of the total amount of the crosslinking monomer in the cured photo-curable resin composition may be 10 wt % or more, 15 wt % or more, 20 wt % to 50 wt %, and 45 wt % or less, or 40 wt % or less.

The photo-curable resin composition may further comprise inorganic oxide nanoparticles. When the photo-curable resin composition further comprises inorganic oxide nanoparticles, the mechanical strength and durability can be improved.

The inorganic oxide nanoparticles may have, for example, a spherical shape. The size of the inorganic oxide nanoparticles can be selected in view of preventing light scattering. For example, the average size of the inorganic oxide particles may be from 1 nm to 1000 nm or from 30 nm to 150 nm. The total solid content concentration of the inorganic oxide nanoparticles may be 30 wt % or more, 35 wt % or more, 40 wt % to 70 wt %, and 65 wt % or less, or 60 wt % or less. The photo-curable resin composition may comprise smaller nanoparticles with a solid content concentration of about 10 wt % or less. The average size of such inorganic oxide nanoparticles may be 1 nm or more, 5 nm to 50 nm, and 40 nm or less, or 30 nm or less. As the inorganic oxide nanoparticles, silica may be used.

The photo-curable resin composition may further comprise high refractive inorganic nanoparticles. The high refractive inorganic nanoparticle may have a refractive index of at least 1.60, 1.65, 1.70, 1.75, 1.80, 1.85, 1.90, 1.95, 2.00 or more. The high refractive inorganic nanoparticles comprise, for example, zirconia ($ZrO_2$), titania ($TiO_2$), antimony oxide, alumina, tin oxide alone or in a combination thereof. Furthermore, a metal oxide incorporated into the high refractive inorganic nanoparticles may be used.

The high refractive inorganic nanoparticles may be treated with a surface treatment agent. Such a surface treatment can secure dispersion stability in the photo-curable resin composition. As the surface treatment agent, alcohol, amine, carboxylic acid, sulfonic acid, phosphonic acid, silane, and titanate can be exemplified. The preferred type of surface treatment agent is determined by the chemical nature of the surface of the inorganic nanoparticles. Silane is preferred for silica and others are preferred for siliceous filling agents. Silane and carboxylic acid are preferred for metal oxides such as zirconia.

In one example, the inorganic nanoparticles comprise at least one copolymerizable silane surface treatment agent. Suitable (meth)acrylic organosilanes include, for example, (meth)acryloyl alkoxysilanes, such as 3-(methacryloyloxy)propyl trimethoxysilane, 3-acryloyloxypropyl trimethoxysilane, 3-(methacryloyloxy)propylmethyl dimethoxysilane, 3-(acryloyloxypropyl)methyl dimethoxysilane, 3-(methacryloyloxy)propyldimethyl methoxysilane, and 3-(acryloyloxypropyl)dimethyl methoxysilane. In some embodiments, (meth)acrylic organosilanes may be preferred over acrylic silanes. Suitable vinyl silanes include vinyldimethyl ethoxysilane, vinylmethyl diacetoxysilane, vinylmethyl diethoxysilane, vinyl triacetoxysilane, vinyl triethoxysilane, vinyl triisopropoxysilane, vinyl trimethoxysilane, vinyl triisopropoxysilane, vinyl trimethoxysilane, vinyl triphenoxysilane, vinyl tri-t-buthoxysilane, vinyl tris-isobutoxysilane, vinyl triisoprophenoxysilane, vinyl tris(2-methoxyethoxy) silane. Suitable amino organosilanes are described, for example, in US 2006/0147177, which is incorporated herein by reference.

In one specific example, the photo-curable resin composition may comprise a trifunctional or higher (meth)acrylate containing alkoxy repeating units having 2 to 4 carbon atoms, a trifunctional or higher (meth)acrylate containing no alkoxy repeating unit, and 30 wt % or more of a solid content of silica nanoparticles having an average particle size of 50 to 150 nm.

The photo-curable resin composition may further comprise a photoinitiator. The photoinitiator can be exemplified by an ultraviolet initiator or a visible light initiator. As the ultraviolet initiator, benzoins, benzophenones or acetophenones, and the like can be exemplified. As the visible light initiator, acylphosphine oxides, thioxanthones, metallocenes, quinines or α-aminoalkylphenones, and the like can be exemplified. The photoinitiator may be included in a ratio of 1 part by weight to 10 parts by weight relative to 100 parts by weight of the photo-curable resin composition, but this may be suitably adjusted, if necessary.

The photo-curable resin composition may further comprise a silane coupling agent. The silane coupling agent may improve heat resistance and moisture resistance by enhancing adhesiveness and adhesive stability, and also serve to improve adhesive reliability even when left in a harsh condition for a long time. As the silane coupling agent, γ-glycidoxypropyl triethoxysilane, γ-glycidoxypropyl trimethoxysilane, γ-glycidoxypropylmethyl diethoxysilane, γ-glycidoxypropyl triethoxysilane, 3-mercaptopropyl trimethoxysilane, vinyl trimethoxysilane, vinyl triethoxysilane, γ-methacryloxypropyl trimethoxysilane, γ-methacryloxypropyl triethoxysilane, γ-aminopropyl trimethoxysilane or γ-aminopropyl triethoxysilane, and the like can be exemplified, and one or a mixture of two or more of the above-described coupling agents may be used. The silane coupling agent may be contained in a ratio of 1 part by weight to 10 parts by weight relative to 100 parts by weight of the photo-curable resin composition, but this may be suitably adjusted, if necessary.

The photo-curable resin composition may further comprise an antioxidant. The antioxidant may be contained in a ratio of 0.01 to 5 parts by weight, more specifically 0.01 to 3 parts by weight, relative to 100 parts by weight of the photo-curable composition, but this may be suitably adjusted, if necessary.

In addition to the above additives, the photo-curable resin composition may further comprise, if necessary, additives such as an elastomer, a curing agent, a plasticizer, a filling agent, a colorant, an ultraviolet stabilizer, a toning agent, a reinforcing agent, a defoamer, a surfactant or a rust inhibitor depending on the desired use.

The photo-curable resin composition may have an elastic modulus of 10,000 Pa to 100,000 Pa measured at 1 Hz and 25° C. when a shear strain of 5% has been applied thereto after main curing. More specifically, the elastic modulus may be 10,000 Pa to 50,000 Pa or 10,000 Pa to 30,000 Pa. The elastic modulus may be a value measured by 'Measurement Example 1. Elastic Modulus Measurement after Main Curing' to be described below. Specifically, the elastic modulus may be an elastic modulus value measured after curing it by irradiating with light having a wavelength of 365 nm at an intensity of 200 mW/cm$^2$ and a light quantity of 4000 mJ/cm$^2$. When the elastic modulus after the main curing is in the above range, it can have various physical properties such as heat resistance, adhesive force and cohesive force as well as physical properties suitable for the Dam & Fill process.

The photo-curable resin composition may have an elastic modulus of 1,500 Pa to 10,000 Pa measured at 1 Hz and 25° C. when a shear strain of 5% has been applied thereto after pre-curing. More specifically, the elastic modulus may be 2,000 Pa to 9,000 Pa or 3,000 Pa to 8,000 Pa. The elastic modulus may be a value measured by 'Measurement Example 2. Elastic Modulus Measurement after Pre-curing' to be described below. Specifically, the elastic modulus may be an elastic modulus value measured after curing it by irradiating with light having a wavelength of 395 nm at an intensity of 100 mW/cm$^2$ and a light quantity of 200 mJ/cm$^2$. When the elastic modulus after the pre-curing is in the above range, it can have various physical properties such as heat resistance, adhesive force and cohesive force as well as physical properties suitable for the Dam & Fill process.

The viscosity of the photo-curable resin composition at 1 Hz and 25° C. may be 1,000 cp to 10,000 cp, more specifically 3,000 cp to 6,000 cp. The viscosity can be measured by 'Measurement Example 3. Viscosity Measurement' to be described below. When the viscosity of the photo-curable resin composition is in the above range, not only various physical properties such as heat resistance, adhesion, and cohesive force but also physical properties suitable for the Dam & Fill process can be obtained.

The present application also relates to a use of the photo-curable resin composition. The photo-curable resin composition has excellent various physical properties such as adhesive force, heat resistance and cohesive force, and exhibits an elastic modulus after pre-curing, which is suitable for the Dam & Fill process, so that it can be used for direct bonding of an optical member.

The Dam & Fill process using the photo-curable resin composition can be carried out by applying the composition to an outer ward of a certain substrate to form a dam and then pre-curing it, and applying the composition to the inner side of the pre-cured dam and then laminating another substrate and main curing it.

In this specification, the curing may mean a process in which the photo-curable composition exhibits adhesiveness or tackiness through physical or chemical actions or reactions of components contained in the composition. The pre-curing or main curing of the photo-curable resin composition can be performed by a process of holding the composition at an appropriate temperature or a process of irradiating it with an appropriate active energy ray so that curing of the curable materials can proceed. When the maintenance at an appropriate temperature and the irradiation of an active energy ray are simultaneously required, the above processes can be carried out sequentially or simultaneously.

Here, the irradiation of the active energy ray may be performed using, for example, a metal halide UV lamp, an LED lamp, a high-pressure mercury lamp, a non-electrode lamp or a xenon lamp, and the like. The conditions such as the wavelength or light quantity of the active energy ray to be irradiated can be selected within a range in which curing of the curable materials can be appropriately performed. In one example, the pre-curing may be performed by irradiating it with light having a wavelength of 365 nm to 395 nm at an intensity of 100 mW/cm$^2$ to 1000 mW/cm$^2$ and a light quantity of 100 mJ/cm$^2$ to 1000 mJ/cm$^2$. The main curing may be performed by irradiating it with light having a wavelength of 365 nm to 395 nm at an intensity of 100 mW/cm$^2$ to 1000 mW/cm$^2$ and a light quantity of 1000 mJ/cm$^2$ to 4000 mJ/cm$^2$.

The present invention relates to a display device comprising a cured product of the photo-curable resin composition and at least two or more optical members attached via the cured product. In this specification, the cured product may mean a material in a cured state. The cured product may have a thickness of 10 μm to 10 mm, but this may be suitably adjusted, if necessary.

Figure 1:
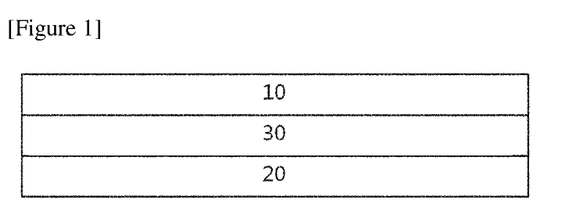
FIG. 1 exemplarily shows a display device of the present application.

In one example, the display device may have a structure in which a first optical member (10) and a second optical member (20) are closely contacted by the cured product (30) without any air gap, as shown in FIG. 1.

Figure 2:
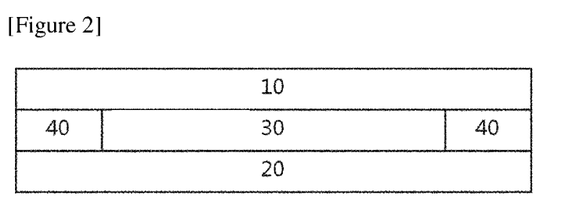
FIG. 2 exemplarily shows a display device of the present application.

In another example, the display device may have a structure in which a space between a first optical member (10) and a second optical member (20) spaced apart by spacers (40), a so-called air gap, is filled by the cured product (30), as shown in FIG. 2. The structure of the air gap is not limited to FIG. 2, which can be changed depending on the structure of the optical member constituting the display device.

The first optical member and the second optical member may mean any optical member constituting the display device, and for example, may mean a touch panel and a display panel, but is not limited thereto.

The cured product of the photo-curable resin composition can be used not only for bonding between the optical members constituting the display device but also for bonding between the display device and other optical members. For the purpose of improving visibility or preventing breakage of the display device from external impact, a transparent plastic plate such as an acrylic plate (for example, a hard coating or an antireflection coating may also be treated to one side or both sides), a PC (polycarbonate) plate, a PET (polyethylene terephthalate) plate and a PEN (polyethylene naphthalate) plate, a tempered glass (for example, a shatterproof film may also be attached) or a touch panel input sensor, and the like can be exemplified as the optical member.

The display device can be exemplified by a liquid crystal display, an organic electroluminescence device or a plasma display, and the like, but is not limited thereto. When the cured product is applied to the display device, other components constituting the display device or a method of constituting the device are not particularly limited, and as long as the cured product is used, any material or method can be all employed.

Advantageous Effects

The present application can provide a photo-curable resin composition having not only excellent various physical properties such as heat resistance, adhesive force and cohesive force but also an elastic modulus after pre-curing which is suitable for a Dam & Fill process. The photo-curable resin composition may be useful for direct bonding between optical members or as a filling agent of an air gap.

EXPLANATION OF REFERENCE NUMERALS

10: first optical member
20: second optical member
30: cured product
40: spacers

BEST MODE

Hereinafter, the present application will be described in more detail with reference to examples and comparative examples, but the scope of the present application is not limited by the following examples.

The physical properties and properties of examples and comparative examples are measured as follows.

Measurement Example 1. Elastic Modulus Measurement After Main Curing

Each of the photo-curable resin compositions of Examples and Comparative Examples was applied between the films subjected to the release treatment, and then irradiated with ultraviolet rays having a wavelength of 365 nm at an intensity of 200 mW/cm$^2$ and a light quantity of 4000 mJ/cm$^2$ using a metal halide UV lamp (D-bulb) and cured to be a thickness of 1 mm after curing. The cured product was tailored to prepare a circular sample having a diameter of 8 mm and a thickness of 1 mm, and then the elastic modulus (G') was measured using an ARES-G2 Rheometer from TA instruments.
Measuring frequency: 1 Hz
Measuring temperature: 25° C.
Measuring strain: 5%,
Measuring mode: frequency sweep mode Measurement Example 2. Elastic Modulus Measurement After Pre-Curing Each of the photo-curable resin compositions of Examples and Comparative Examples was applied between the films subjected to the release treatment, and then irradiated with light having a wavelength of 395 nm at an intensity of 100 mW/cm$^2$ and a light quantity of 200 mJ/cm$^2$ using a LED lamp and cured to be a thickness of 1 mm after curing. The cured product was tailored to prepare a circular sample having a diameter of 8 mm and a thickness of 1 mm, and then the elastic modulus (G') was measured using an ARES-G2 Rheometer from TA instruments.
Measuring frequency: 1 Hz
Measuring temperature: 25° C.
Measuring strain: 5%,
Measuring mode: frequency sweep mode Measurement Example 3. Viscosity Measurement For the photo-curable resin compositions of Examples and Comparative Examples, the viscosity was measured using an ARES-G2 Rheometer from TA instruments.
Measuring frequency: 1 Hz
Measuring temperature: 25° C.
Measuring strain: 10%,
Measuring mode: frequency sweep mode
Measuring cell diameter: 8 mm Measurement Example 4. Stress Relaxation Test Each of the photo-curable resin compositions of Examples and Comparative Examples was applied between the films subjected to the release treatment and irradiated with light having a wavelength of 395 nm at an intensity of 100 mW/cm$^2$ and a light quantity of 200 mJ/cm$^2$ using a LED lamp and cured to be a thickness of 1 mm after curing. The cured product was tailored to prepare a circular sample having a diameter of 8 mm and a thickness of 1 mm, and then the stress was measured for 60 seconds, while applying a shear strain of 5% at 25° C., using an ARES-G2 Rheometer from TA instruments. Stress Relaxation (=Elastic Portion, %) is calculated as a ratio (%, $S_{60}/S_0$) of the stress ($S_{60}$) after 60 seconds relative to the initial stress ($S_0$).

Evaluation Example 1. Evaluation of Lamination Performance

Each photo-curable resin composition of Examples and Comparative Examples was applied to a soda-lime glass (1T, 150 mm×150 mm) substrate using a dispenser to apply a dam having a width of 2 mm thereon. It was irradiated with light having a wavelength of 395 nm at an intensity of 100 mW/cm$^2$ and a light quantity of 200 mJ/cm$^2$ using a LED lamp and pre-cured. 2 g of the same photo-curable resin composition as the dam was applied to the inner side of the pre-cured dam, and then a soda lime glass (1T, 150 mm×150 mm) substrate was laminated with a pressure of 10 Kg. The evaluation criteria of the lamination performance are as follows.
O: No bubble is generated at the interface between the dam and the fill, and the shape and area of the dam are maintained
Δ: No bubble is generated at the interface between the dam and the fill, but the shape and area of the dam are maintained insufficiently
X: Bubbles are generated at the interface between the dam and the fill due to the restoring force of the dam upon lamination Preparation Example 1. Preparation of Monofunctional Silicone Oligomer (A1)

Instruments
Thermometers, stirrers, water-cooled condensers, nitrogen gas
Preparation Method
350 g of polydimethylsiloxane diol of Formula A (Silaplane FM-4411, Chisso Corporation), 112 g of isophorone diisocyanate (isocyanate group content 37.8%) and 1 g of dibutyltin dilaurate in a flask were reacted at 60° C. for 5 hours. Next, 9.8 g of hydroxyethyl acrylate and 15.6 g of lauryl alcohol were dropped, and the reaction was continued as such and terminated when the isocyanate group disappeared.

[Formula A]

Preparation Example 2. Preparation of Difunctional Silicone Oligomer (A2)

Instruments

Thermometers, stirrers, water-cooled condensers, nitrogen gas

Preparation Method 350 g of polydimethylsiloxane diol of Formula A (Silaplane FM-4411, Chisso Corporation), 102.7 g of isophorone diisocyanate (isocyanate group content 37.8%), and 1 g of dibutyltin dilaurate in a flask were reacted at 60° C. for 5 hours. Next, 4.9 g of hydroxyethyl acrylate, 6.1 g of hydroxybutyl acrylate and 7.4 g of lauryl alcohol were dropped, and the reaction was continued as such and terminated when the isocyanate group disappeared.

Preparation Example 3. Non-Reactive Silicone Oligomer (B1)

Monohydroxyl polysiloxane (FM-0411, Chisso Corporation) of Formula B below was prepared as the non-reactive silicone oligomer (B1).

[Formula B]

Preparation Example 4. Non-Reactive PDMS Modified Acrylate Oligomer (B2)

Instruments

Thermometers, stirrers, water-cooled condensers, nitrogen gas

Preparation Method 350 g of polydimethylsiloxane diol of Formula A (Silaplane FM-4411, Chisso Corporation), 124.4 g of isophorone diisocyanate (isocyanate group content 37.8%), and 1 g of dibutyltin dilaurate in a flask were reacted at 60° C. for 5 hours. Next, 52.2 g of lauryl alcohol was dropped, and the reaction was continued as such and terminated when the isocyanate group disappeared.

Examples 1 to 4 and Comparative Examples 1 to 3

Preparation of Photo-Curable Resin Composition

The reactive silicone oligomers (A), the non-reactive silicone oligomers (B), the monomers (C) and other additives (D) were compounded in the ratios shown in Table 1 below to prepare a photo-curable resin composition.

TABLE 1

| Unit (part by weight) | | Example 1 | Example 2 | Example 3 | Example 4 | Comparative Example 1 | Comparative Example 2 | Comparative Example 3 |
|---|---|---|---|---|---|---|---|---|
| A | A1 | 20 | 20 | | 25 | 20 | 15 | 20 |
|   | A2 | 30 | 30 | 45 | 35 | 30 | 15 | 30 |
| B | B1 | 45 | | | | | 60 | |
|   | B2 | | 45 | 35 | 30 | 45 | | 45 |
| C | C1 | | | 2 | | | | 7 |
|   | C2 | 1 | 1 | | 4 | | 1 | |
|   | C3 | 2 | | 15 | | 2 | 2 | 2 |
|   | C4 | 2 | 2 | 3 | 6 | 3 | 2 | 2 |
|   | C5 | | 2 | | | | | |
| D | D1 | 5 | 5 | 5 | 5 | 5 | 5 | 5 |
|   | D2 | 5 | 5 | 5 | 5 | 5 | 5 | 5 |
|   | D3 | 1 | 1 | 1 | 1 | 1 | 1 | 1 |

A1: monofunctional silicone oligomer (Mw: 40,000)
A2: difunctional silicone oligomer (Mw: 70,000)
B1: non-reactive silicone oligomer (Mw: 10,000)
B2: non-reactive PDMS modified urethane oligomer (Mw: 10,000)
C1: diethylene glycol diacrylate
C2: triethylene glycol diacrylate
C3: lauryl acrylate
C4: isobornyl acrylate
C5: hydroxyethyl acrylate
D1: initiator (Irgacure 184, BASF)
D2: silane coupling agent (KBM-403, Shin-Etsu)
D3: antioxidant (Irganox 1010, BASF)

Figure 3:
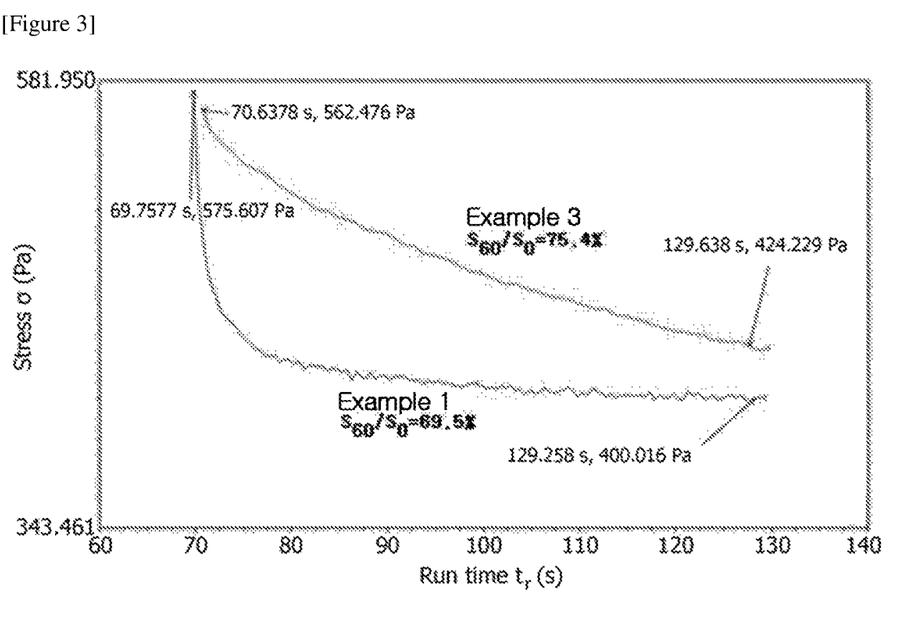
FIG. 3 is stress relaxation graphs of Example 1 and Example 3.
Figure 4:
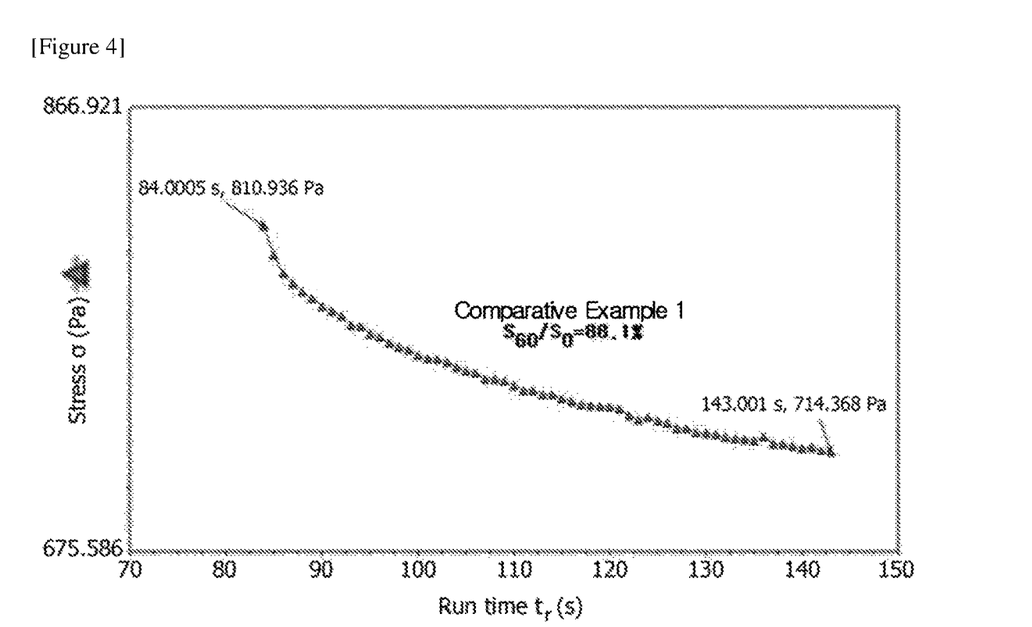
FIG. 4 is a stress relaxation graph of Comparative Example 1.

The results of evaluation of physical properties of Examples and Comparative Examples were described in Table 2 below. FIG. 3 is stress relaxation graphs of Example 1 and Example 3, and FIG. 4 is a stress relaxation graph of Comparative Example 1. In FIG. 3, the shear strain was applied in about 70 seconds based on Run time (s), and in FIG. 4, the shear strain was applied in about 84 seconds based on Run time (s). That is, in FIG. 3, $S_0$ is the stress measured at about 70 seconds based on the running time and $S_{60}$ is the stress measured after about 60 seconds therefrom, and in FIG. 4, $S_0$ is the stress measured at about 84 seconds based on the running time and $S_{60}$ is the stress measured after about 60 seconds therefrom.

TABLE 2

| | Example 1 | Example 2 | Example 3 | Example 4 | Comparative Example 1 | Comparative Example 2 | Comparative Example 3 |
|---|---|---|---|---|---|---|---|
| Main curing modulus (Pa) | 19000 | 22000 | 18500 | 20000 | 20000 | 12000 | 24000 |
| Pre-curing modulus (Pa) | 6000 | 6200 | 7200 | 3200 | 12000 | 1700 | 1450 |
| Viscosity (cP) | 4200 | 5100 | 3300 | 4900 | 4200 | 3900 | 3200 |
| $S_0$ (Pa) | 575 | 810 | 562 | 467 | 810 | 490 | 510 |
| $S_{60}$ (Pa) | 400 | 583 | 424 | 196 | 714 | 186 | 163 |
| Stress relaxation (%) | 69 | 72 | 75 | 42 | 88 | 38 | 32 |
| Lamination performance | ○ | ○ | ○ | ○ | X | Δ | Δ |

The invention claimed is:

1. A photo-curable resin composition satisfying Equation 1:

$$40\% \leq S_{60}/S_0 < 80\%$$ [Equation 1]

wherein, $S_0$ is an initial stress when a shear strain of 5% at 25° C. has been applied to the photo-curable resin composition after curing the photo-curable resin composition by irradiating the photo-curable resin composition with light having a wavelength of 395 nm at an intensity of 100 mW/cm² and a light quantity of 200 mJ/cm², and $S_{60}$ is a stress 60 seconds after the initial stress when a shear strain of 5% at 25° C. has been applied;

wherein the photo-curable resin composition comprises 20 parts by weight to 70 parts by weight of a reactive silicone oligomer, 20 parts by weight to 50 parts by weight of a non-reactive silicone oligomer, and 0.5 part by weight to 5 parts by weight of an ethyl ether-based acrylate as a first monomer;

wherein the reactive silicone oligomer is a compound having at least one reactive functional group through a urethane bond at a terminal of a polysiloxane main chain;

wherein the at least one reactive functional group comprises a (meth)acryl group;

wherein the reactive silicone oligomer comprises a difunctional silicone oligomer;

wherein the non-reactive silicone oligomer is a compound of Formula 2,

[Formula 2]

wherein $R_1$ and $R_2$ are each independently an alkyl group connected to the polysiloxane main chain through a urethane bond, $R_3$ to $R_8$ are each independently an alkyl group, a cycloalkyl group, or a phenyl group, and a is an integer of 10 or more;

wherein the ethyl ether-based acrylate is represented by Formula 4,

[Formula 4]

wherein n is an integer of 1 to 6, and $R_3$ to $R_4$ are each independently hydrogen or an alkyl group having 1 to 4 carbon atoms; and wherein the photo-curable resin composition further comprises an alkyl acrylate or a hydroxyalkyl acrylate as a second monomer, and a total ratio of the first monomer and the second monomer is 3 parts by weight to 30 parts by weight relative to 100 parts by weight of the photo-curable resin composition.

2. The photo-curable resin composition according to claim 1, wherein the reactive silicone oligomer further comprises a monofunctional, or trifunctional or higher silicone oligomer.

3. The photo-curable resin composition according to claim 1, wherein the reactive silicone oligomer has a weight average molecular weight (Mw) of 10,000 to 100,000.

4. The photo-curable resin composition according to claim 1, wherein the non-reactive silicone oligomer has a weight average molecular weight (Mw) of 10,000 to 50,000.

5. The photo-curable resin composition according to claim 1, wherein the photo-curable resin composition further comprises a photoinitiator.

6. The photo-curable resin composition according to claim 1, wherein the photo-curable resin composition further comprises a silane coupling agent or an antioxidant.

7. The photo-curable resin composition according to claim 1, wherein the photo-curable resin composition comprises a first trifunctional or higher (meth)acrylate containing alkoxy repeating units having 2 to 4 carbon atoms, a second trifunctional or higher (meth)acrylate, and 30 wt % or more of a solid content of silica nanoparticles having an average particle size of 50 nm to 150 nm.

8. The photo-curable resin composition according to claim 1, wherein the photo-curable resin composition has an elastic modulus of 1,500 Pa to 10,000 Pa measured at 1 Hz and 25° C. when a shear strain of 5% at 25° C. has been applied thereto after curing the photo-curable resin composition by irradiating the photo-curable resin composition with light having a wavelength of 395 nm at an intensity of 100 mW/cm² and a light quantity of 200 mJ/cm².

9. The photo-curable resin composition according to claim 1, wherein the photo-curable resin composition has an elastic modulus of 10,000 Pa to 100,000 Pa measured at 1 Hz and 25° C. when a shear strain of 5% at 25° C. has been applied thereto after curing the photo-curable resin composition by irradiating the photo-curable resin composition with light having a wavelength of 365 nm at an intensity of 200 mW/cm² and a light quantity of 4000 mJ/cm².

10. The photo-curable resin composition according to claim 1, wherein the photo-curable resin composition has a viscosity of 1,000 cp to 10,000 cp measured at 1 Hz and 25° C.

11. A display device comprising a cured product of the photo-curable resin composition of claim 1 and at least two or more optical members attached via the cured product.

* * * * *